(12) United States Patent
Yoon

(10) Patent No.: US 10,582,399 B1
(45) Date of Patent: Mar. 3, 2020

(54) ROAMING ANALYSIS BASED ON USER EQUIPMENT METRICS

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/455,396

(22) Filed: Jun. 27, 2019

(51) Int. Cl.
*H04M 3/00* (2006.01)
*H04W 24/02* (2009.01)
*H04W 64/00* (2009.01)
*H04W 24/08* (2009.01)

(52) U.S. Cl.
CPC .......... *H04W 24/02* (2013.01); *H04W 24/08* (2013.01); *H04W 64/00* (2013.01); *H04W 64/003* (2013.01)

(58) Field of Classification Search
CPC ..... H04W 24/02; H04W 64/00; H04W 24/08; H04W 64/003
USPC ....................................................... 455/419
See application file for complete search history.

(56) References Cited

U.S. PATENT DOCUMENTS

2018/0227198 A1* 8/2018 Walsh .................. H04L 43/045

* cited by examiner

*Primary Examiner* — Amancio Gonzalez
(74) *Attorney, Agent, or Firm* — Lee & Hayes, P.C.

(57) ABSTRACT

User equipment (UE) can include a roaming analyzer to capture call data to monitor conditions of roaming coverage and networks. The UE can aggregate data and report such data to a network device to further aggregate the data and to generate reports. The network device can use the aggregated data to evaluate roaming coverage and to determine a coverage index for each location area code. Network components can be deployed or optimized based at least in part on the coverage index. In some instances, when the UE is connected to a roaming cell, the coverage index can be used to adjust a search frequency for a provider cell.

20 Claims, 7 Drawing Sheets

700

```
CAPTURE, BY A USER EQUIPMENT (UE), CALL INFORMATION
ASSOCIATED WITH A COMMUNICATION
702
```

```
SEND THE CALL INFORMATION TO A REMOTE COMPUTING DEVICE
704
```

```
RECEIVE, FROM THE COMPUTING DEVICE, A COVERAGE INDEX
706
```

```
DETERMINE THAT THE UE IS AT A LOCATION ASSOCIATED WITH THE
REGION OF INTEREST
708
```

```
DETERMINE THAT THE UE IS IN A ROAMING STATE AT THE LOCATION
710
```

```
SCAN ONE OR MORE WIRELESS RESOURCES FOR A SIGNAL
ASSOCIATED WITH THE FIRST NETWORK
712
```

FIG. 7

ROAMING ANALYSIS BASED ON USER EQUIPMENT METRICS

BACKGROUND

Modern telecommunication systems include heterogeneous mixtures of second, third, and fourth generation (2G, 3G, and 4G) cellular-wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

To provide wireless communication coverage across the country and beyond, service providers may contract with each other to provide roaming network outside of what an individual service provider may be able to serve. However, some roaming network may use older generation cellular wireless access technologies, which may result in lower quality service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 illustrates an example process for instructing components of a user equipment to capture call information and receive coverage index, as described herein.

DETAILED DESCRIPTION

Figure 1:
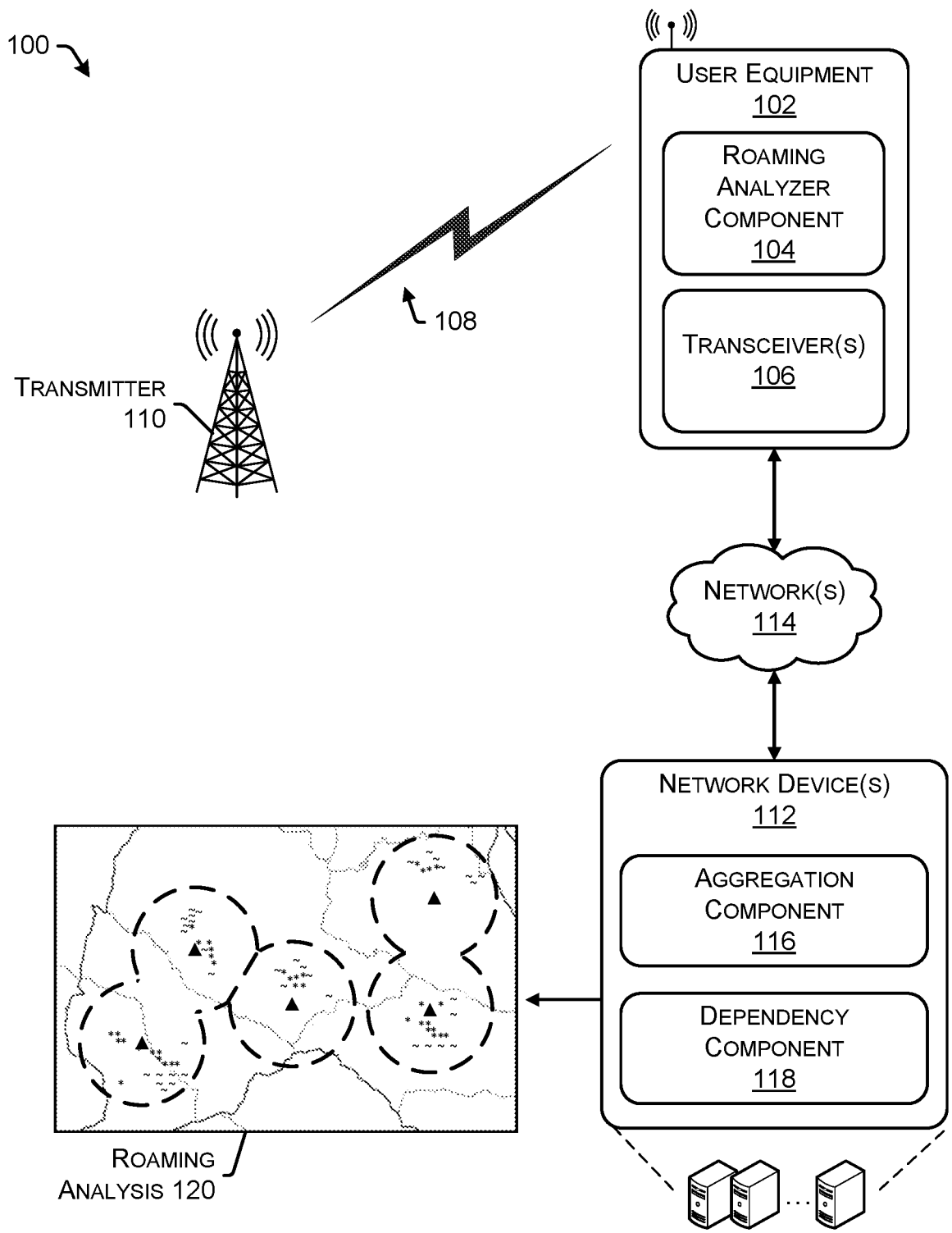
FIG. 1 illustrates an example environment including a user equipment including a roaming analyzer to facilitate mobile collection of call information, as described herein.

Systems, devices, and methods are directed to user equipment including a roaming analyzer to capture call data, and a network device for analyzing the call data to evaluate roaming coverage and networks. In some instances, a user equipment may subscribe to a service provider network. The service provider may provide the roaming analyzer to continuously monitor conditions at the user equipment to facilitate the use of a preferred network coverage over roaming coverage. In some instances, the user equipment can capture call information which can be provided to a network device to determine aggregated call information. A network can be upgraded and/or updated based on such aggregated information. Further, a coverage index can be determined which is indicative of a roaming coverage associated with a particular area. The coverage index can be provided to a user equipment, which can vary a frequency of monitoring for home networks and roaming networks to improve service quality and to save power resources, as discussed herein.

As introduced above, a preferred network may be the service provider's own network. The roaming network may be a contracted carrier network that results in increased business expense to use. In some instances, the roaming analyzer can be implemented as an application or component running on the user equipment configured to interact with an operating system component of the user equipment. The roaming analyzer can instruct the operating system component to control software and/or hardware associated with a transceiver of the user equipment to monitor conditions at the user equipment and provides metrics (e.g., information about location, network environment, call status, etc.) indicative of the conditions to a network server for subsequent analysis.

In examples, one or more metrics are captured and used to evaluate roaming coverage and networks. The one or more metrics captured at the time of a communication may include: an MCC/MNC (mobile country code/mobile network code) (e.g., indicative of a carrier such as T-Mobile, AT&T, Commnet, etc.), geographical location of the user equipment (including latitude/longitude and location accuracy), a cell identifier of a cell serving the user equipment, and a location identifier of the cell. The one or more metrics can be sent to the network device for aggregation and determination of a coverage index for a location range or location area code (LAC). A low coverage index may indicate poor coverage for the location. The coverage index may be used to determine improvements for roaming coverage, for example, to determine whether to deploy a transmitter to the location, to deploy a network engineer to tune one or more transmitters by changing a direction of an antenna or adjusting power, to adjust a search frequency for a user equipment connected to a roaming cell to scan for a preferred provider cell, and the like.

In one use case, the techniques discussed herein can be implemented on a user equipment configured to evaluate roaming and preferred network coverage to improve user communications while roaming. In some instances, the user equipment will connect to a roaming cell and stay in roaming coverage for a default period of time (e.g., 1 hour) without checking for preferred network coverage. In the present example, the user equipment at location A may be served by a roaming cell and may subsequently move to a location B that is covered by a preferred provider cell. However, the user equipment may remain on the roaming network until the default period of time has elapsed before the user equipment will scan for a preferred provider signal. The roaming analyzer can be implemented as an application on the user equipment to adjust the scanning frequency based on information received in relations to a coverage index. Thus, the user equipment may switch communication network to the preferred network faster.

Further, in some instances, the techniques described herein can include determining one or more of a power resource or a location of the user equipment, and decrease (or otherwise vary) the scanning frequency for a preferred provider signal based at least in part on the power resource or the location. For example, if a battery of the user equipment is below a threshold value, the user equipment can be prevented from scanning for a preferred provider signal. In another example, if a location of the user equipment is within a particular location range, such as a location area code with a low coverage index, the user equipment can also be prevented from scanning for the preferred provider signal.

The systems, devices, and techniques described herein can improve a functioning of a network by capturing call information associated with roaming coverage and networks that can be used to deploy and/or optimize network hardware. For example, the systems, devices, and techniques can determine a coverage index for a particular location area code (LAC) to recommend areas where a service provider should increase cell coverage to be utilized for communications by and between user equipment. Further, determining coverage index can allow network engineers to tune components (e.g., power level(s), antenna orientation(s), and the like) in a system to increase coverage for a location with low coverage index. Additionally, the systems, devices, and techniques discussed herein provide a distributed framework for roaming coverage analysis, which provides updated coverage index for different location area code (LAC) to user equipment to automatically adjust a scan frequency when moving from Location A to Location B. For instance, by moving from Location A, with low coverage index, to Location B, with high coverage index, the user equipment may automatically increase the scan frequency to search for the preferred cell sooner. In some instance, if the user equipment is in a location with low coverage index, the techniques can be used to automatically decrease a scan frequency or stop scanning to reduce power consumption to extend a battery life of the user equipment. Further, location-based initiating of scanning can reduce congestion and/or processing of data where such data is not needed. These and other improvements to the functioning of a computer and network are discussed herein.

The systems, devices, and techniques described herein can be implemented in a number of ways. Example implementations are provided below with reference to the following figures.

FIG. 1 illustrates an example environment 100 including a user equipment (UE) including a roaming analyzer to facilitate mobile collection of call information, as described herein.

In some instances, a user equipment 102 can include a roaming analyzer component 104 and one or more transceiver(s) 106. In general, the user equipment 102 can receive a signal 108 output by a transmitter 110 to determine one or more metrics associated with the signal 108. In some instances, the user equipment 102 can receive the signal 108 and analyze the signal 108, as discussed herein, independent of conducting any communications via the signal 108 and/or the transmitter 110. In some instances, the transmitter 110 can represent any one-directional or two-directional wireless communication transceiver.

In some instances, the one or more transceiver(s) 106 can receive the signal 108 at the user equipment 102, and the roaming analyzer component 104 can determine various metrics associated with the signal 108. For example, the one or more metrics can include, but are not limited to, one or more of a received signal strength indication (RSSI), a reference signal received power (RSRP), a reference signal received quality (RSRQ), and a signal-to-interference-plus-noise ratio (SINR). Further, the metrics can include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz, and the like.).

In some instances, the user equipment 102 can receive a plurality of signals, for example, by tuning one or more filters associated with the transceiver(s) 106, to isolate a specific frequency of a signal (e.g., a known preferred provider signal for the area). Other techniques can be used to configure the user equipment 102 to receive a range of frequencies.

The user equipment 102 can communicate with one or more network device(s) 112 via one or more network(s) 114.

In some instances, the network device(s) 112 can include an aggregation component 116 and a dependency component 118. The aggregation component 116 can receive one or more metrics from the user equipment 102, as well as other user equipment, and aggregate the metrics. The dependency component 118 can analyze the aggregated metrics to estimate roaming coverage for each local area code (LAC) and to generate roaming analysis 120. In some instances, and as discussed herein, the roaming analysis 120 can be used, at least in part, to determine locations of transmitters that are active and the estimated coverage, to determine locations where to deploy base stations or other network devices, to determine locations where a network signal is associated with poor quality, to inform decisions regarding optimization of wireless transmissions, and the like. As can be understood, the aggregation component 116 and the dependency component 118 is not limited to outputting the roaming analysis 120, and any number of visualizations or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 112 can be implemented as one or more communication servers to facilitate communications by and between the various devices in the environment 100. That is, the network device(s) 112 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 112 may implement GSM, UMTS, LTE/LTE Advanced, and/or NR telecommunications technologies. In some instances, the telecommunication technologies can be referred to generally as a radio access technology. Thus, a 5G network can represent a 5G radio access technology. The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 112, and/or the network(s) 114. In some embodiments, the network device(s) 112 are operated by a service provider. While FIG. 1 illustrates the network device(s) 112, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 can include, but are not limited to, networks including second-generation (2G), third-generation (3G), fourth-generation (4G) cellular networks, such as LTE (Long Term Evolution), fifth-generation (5G) networks, and data networks, such as Wi-Fi networks.

In some instances, the user equipment 102 can communicate with any number of user equipment, servers, network devices, computing devices, and the like.

Figure 2:
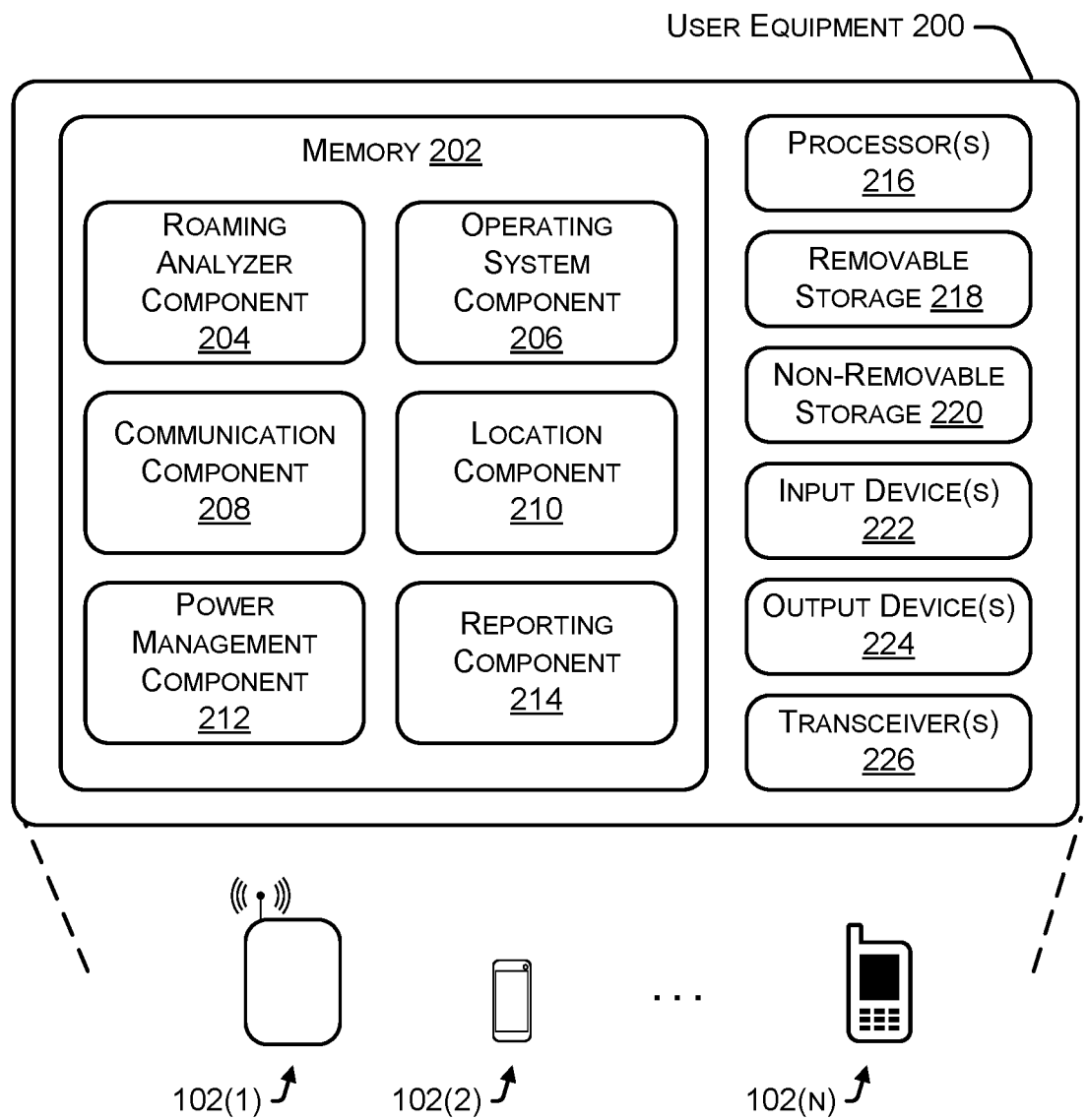
FIG. 2 illustrates an example user equipment configured to implement the roaming analyzer, in accordance with embodiments of the disclosure.

FIG. 2 illustrates an example user equipment 200 configured to implement the roaming analyzer, in accordance with embodiments of the disclosure. In some embodiments, the user equipment 200 can correspond to the user equipment 102 of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 102(1), 102(2), . . . , 102(N).

As illustrated, the user equipment 200 comprises a memory 202 storing a roaming analyzer component 204, an operating system component 206, a communication component 208, a location component 210, a power management component 212, and a reporting component 214. Also, the user equipment 200 includes processor(s) 216, a removable storage 218 and non-removable storage 220, input device(s) 222, output device(s) 224, and transceiver(s) 226.

In various embodiments, memory 202 is volatile (such as RAM), non-volatile (such as ROM, flash memory, etc.) or some combination of the two. The roaming analyzer component 204, the operating system component 206, the communication component 208, the location component 210, the power management component 212, and the reporting component 214 stored in the memory 202 can comprise methods, threads, processes, applications or any other sort of executable instructions. The roaming analyzer component 204, the operating system component 206, the communication component 208, the location component 210, the power management component 212, and the reporting component 214 can also include files and databases.

The roaming analyzer component 204 can include functionality to determine one or more metrics associated with a signal received, detected, or otherwise monitored by the user equipment 200. For example, the roaming analyzer component 204 can determine metrics including but not limited to RSSI, RSRP, RSRQ, SINR, power density and the like for a specific bandwidth in the frequency domain. The roaming analyzer component 204 can instruct the operating system component to control software and/or hardware associated with a transceiver of the user equipment to monitor conditions at the user equipment and to provide metrics (e.g., information about location, network environment, call status, etc.) indicative of the conditions to a network server for subsequent analysis. In some instances, information can be associated with the metrics, such as the MCC/MNC (mobile country code/mobile network code) (e.g., indicative of a carrier such as T-Mobile, AT&T, Commnet, etc.), geographical location of the user equipment (including latitude/longitude and location accuracy), a cell identifier of a cell serving the user equipment, a location identifier of the cell, and the like. In some instances, the information may refer to service provider information and geolocation information. The service provider information may include any information associated with the service provider, such as the MCC, the MNC, the carrier name, and the like. The geolocation information may include any information associated with the location, such as an address, the location latitude, the location longitude, the location accuracy, the location altitude, the location identifier, the location area code, and the like. The roaming analyzer component 204 can send the metrics to a network device to aggregate and analyze the metrics.

In some instances, the roaming analyzer component 204 can receive a coverage index determined by the network device. As will be described herein with respect to network device 300, a coverage index can be determined for a location range or location area code (LAC). When a user equipment enters a particular location range, and the user equipment is connected to a roaming cell, the roaming analyzer component 204 can use the coverage index to adjust a frequency of searching for a preferred cell. This optimizes a battery life of the user equipment by preventing searching for a preferred cell in areas with a low coverage index.

In some instances, the roaming analyzer component 204 can scan a frequency resource at any regular or irregular interval or can initiate a scan based on an internal or external trigger or command. For example, the roaming analyzer component 204 can receive an instruction from the remote network device to initiate a scan. Additionally, the roaming analyzer component 204 can initiate a rescan at a default time interval (e.g., every 1 hour). As discussed herein, the roaming analyzer component 204 can receive an instruction from the remote network device to adjust the scan frequency from the default time interval to a shorten time interval (e.g., from every 1 hour to every half hour, or any other time interval(s)) based on a high coverage index. The roaming analyzer component 204 can determine whether a coverage index is high or low based on one or more predetermined threshold range. In some instances, the roaming analyzer component 204 can determine operating conditions or characteristics of the user equipment 200 (e.g., a power resource, location, etc.), and a command to initiate scanning can be based at least in part on those operating conditions or characteristics. In some instances, the roaming analyzer component 204 can prevent rescans based on a low coverage index.

In some instances, the roaming analyzer component 204 can be implemented as an application operating on the user equipment 200. In some instances, to initiate a scan of one or more frequency resources, the roaming analyzer component can call an API (application programming interface) implemented in the operating system component 206, for example.

In some instances, the roaming analyzer component 204 can include functionality to present a user interface on the user equipment 200, for example, to receive an indication from a user enabling or disabling a roaming analyzer mode of the roaming analyzer component 204. For example, in some instances, a user of the user equipment can turn on or turn off the roaming analyzer component 204 based on personal preferences, incentives from a service provider, inclusion in a voluntary program, and the like.

In some instances, the roaming analyzer component 204 can correspond to the roaming analyzer component 104 of FIG. 1.

The operating system component 206 can include functionality to query a chipset of the user equipment 200, and/or to query the transceiver(s) 226, to instruct the transceiver(s) 226 and/or any software or hardware to scan one or more channels or frequency resources to determine metrics associated with the channel or frequency resources, for example. In some instances, the operating system component 206 can include a first API to receive instructions from the roaming analyzer component 204 and to provide data to the roaming analyzer component 204, and a second API to issue instructions to software or hardware associated with a modem or the transceiver(s) 226 and to receive data from such components.

The communication component 208 can include functionality to conduct communications with one or more other devices, as discussed herein. In some instances, the communication component 208 can conduct a communication via a first set of frequency resources associated with a roaming network, while the roaming analyzer component 204 can scan a second set of frequency resources for a signal associated with a preferred network. In some instances, the communication component 208 can take priority over resources of the user equipment 200 to conduct a communication. That is, if the roaming analyzer component 204 initiates a scan of a frequency resource, and if the communication component 208 subsequently initiates a communication using the frequency resource or another frequency resource, in some instances, the communication component 208 can initiate the communication by interrupting the roaming analyzer component 204. In some instances, other prioritization schemes may be used, and the communication component 208 can have any relative or absolute priority level.

The location component 210 can include functionality to determine a location of the user equipment 200. In some instances, the location component 210 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 210 can determine a location of the user equipment 200 relative to a location of a geofenced location. For example, the location component 210 can receive a geofenced location from a network device.

The power management component 212 can include functionality to determine a status and/or level of a power resource of the user equipment 200. For example, the power management component 212 can determine a remaining battery percentage, remaining charge, used charge, etc. to evaluate resources of the user equipment 200. Further, the power management component 212 can determine that the power resource is above or below a threshold value, for example, to determine whether the remaining amount of energy is sufficient for expected levels of activity. In some instances, a schedule for initiating scanning of frequency resources can be based at least in part on a power resource of the user equipment 200. For example, when a battery level is relatively high (and/or the user equipment 200 is connected to an external source of power) the scanning can be initiated more frequently than when a battery level is relatively low (and/or the user equipment is not connected to external power). Of course, a variety of power management schemes can be used to initiate scanning based at least in part on available power resources.

The reporting component 214 can include functionality to store one or more metrics associated with one or more frequency resources and to send such metrics to a network device. In some instances, the reporting component 214 can send the one or more metrics to a network device as the one or more metrics are generated, captured, or determined. In some instances, the reporting component 214 can aggregate the metrics and send the aggregated metrics to the network device. In some instances, the reporting component 214 can send a reduced data set based on the roaming state of the user equipment 200 (e.g., when the user equipment 200 is connected to a roaming network). In some instances, the reporting component 214 can send the metrics at a time of low network congestion (e.g., at night). In some instances, the reporting component 214 can transmit metrics in response to a query from a network device. In some instances, the reporting component 214 can encode the data sent to a network device such that a service provider tracking data usage does not count the data against a quota associated with the user equipment 200.

In some embodiments, the processor(s) 216 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a roaming analyzer, and the like. During execution on the user equipment 102, each of the applications may be configured to cause the user equipment 102 to initiate data communications with the network device(s) 112 over the network(s) 114.

The user equipment 102 may be configured to communicate over a telecommunications network using any common wireless and/or wired network access technology. Moreover, the user equipment 102 may be configured to run any compatible device operating system (OS), including but not limited to, Microsoft Windows Mobile, Google Android, Apple iOS, Linux Mobile, as well as any other common mobile device OS.

The user equipment 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the user equipment 200 also includes one or more wired or wireless transceiver(s) 226. For example, the transceiver(s) 226 can include a network interface card (NIC), a network adapter, a LAN adapter, or a physical, virtual, or logical address to connect to various network(s) 114, or to the network device(s) 112, for example. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMax, Bluetooth, infrared communication, and the like.

In some instances, the transceiver(s) 226 can correspond to the transceiver(s) 106 of FIG. 1.

Figure 3:
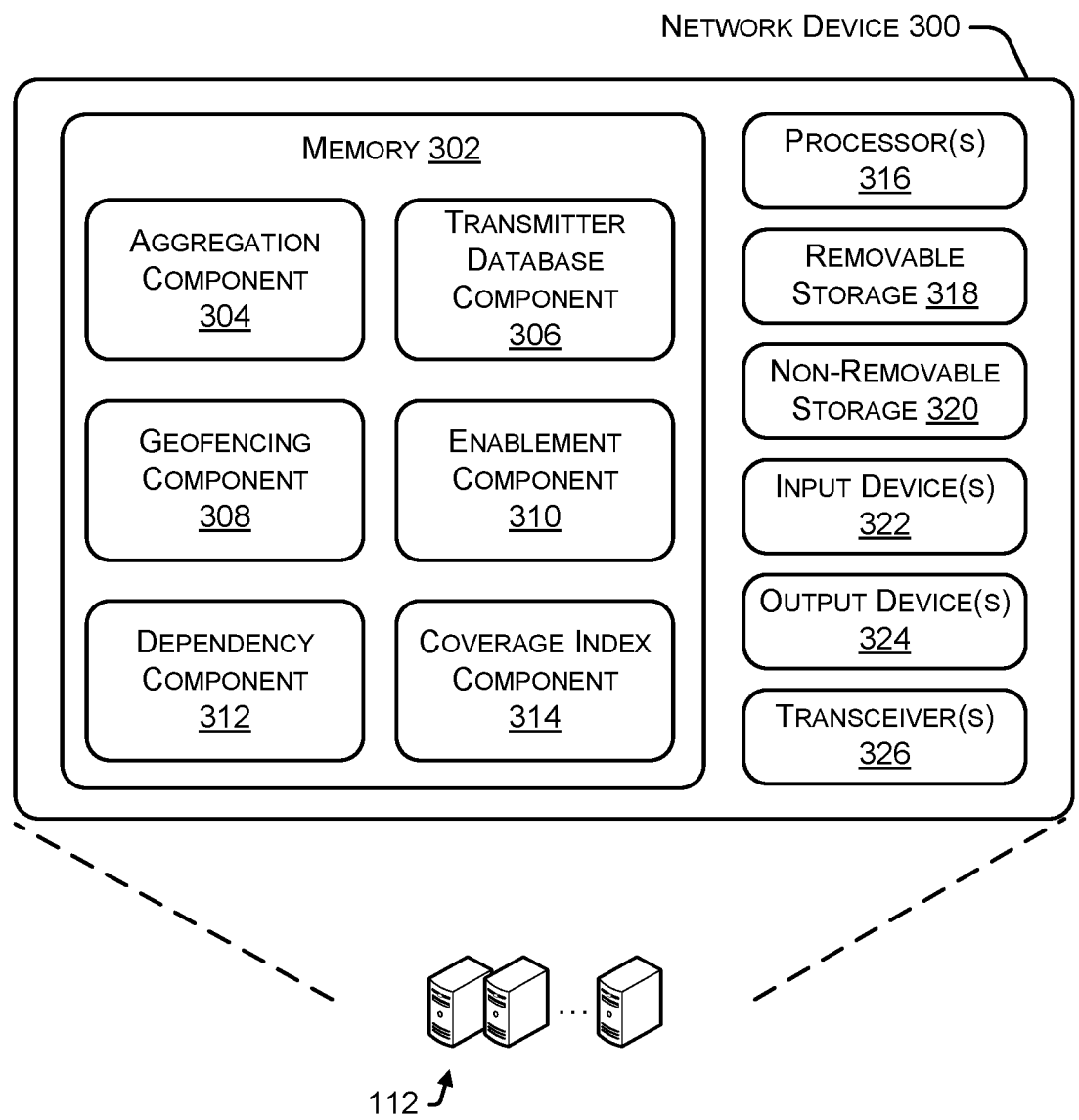
FIG. 3 illustrates an example network device configured to receive call information captured by user equipment, in accordance with embodiments of the disclosure.

FIG. 3 illustrates an example network device 300 configured to receive call information captured by user equipment, in accordance with embodiments of the disclosure. In some embodiments, the network device 300 can correspond to the network device 112 of FIG. 1. It is to be understood in the context of this disclosure that the network device 300 can be implemented as a single device or as a plurality of devices with components and data distributed among them.

As illustrated, the network device 300 comprises a memory 302 storing an aggregation component 304, a transmitter database component 306, a geofencing component 308, an enablement component 310, a dependency component 312, and a coverage index component 314. Also, the network device 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The aggregation component 304, the transmitter database component 306, the geofencing component 308, the enablement component 310, the dependency component 312, and the coverage index component 314 stored in the memory 302 can comprise methods, threads, processes, applications or any other sort of executable instructions. The aggregation component 304, the transmitter database component 306, the geofencing component 308 the enablement component 310, the dependency component 312, and the coverage index component 314 can also include files and databases.

The aggregation component 304 can include functionality to receive one or more metrics determined and/or captured by user equipment, as discussed herein. In some instances, the aggregation component 304 can receive a plurality of metrics and store the metrics in a database. In some instances, the metrics can be indexed by location, time, user equipment, and the like. In some instances, the aggregation component 304 can perform any statistical analysis on the metrics to determine a variety of signal characteristics. For example, the aggregation component 304 can determine a signal type (e.g., TV, radio, cell phone, etc.) as well as quantitate or qualitative characteristics of the signal.

In some instances, the aggregation component 304 can correspond to the aggregation component 116 of FIG. 1.

The transmitter database component 306 can store locations of transmitters and/or base stations in a database. Further, the transmitter database component 306 can receive location data and/or metrics associated with a signal to determine which transmitter corresponds to the metrics. In some instances, the transmitter database component 306 can determine a confidence value associated with the identity of a transmitter or base station.

The geofencing component 308 can include functionality to determine areas in which the roaming analysis should be performed. For example, the geofencing component 308 can determine areas (e.g., location range or location area code (LAC)) around a transmitter where metrics are to be determined. In further examples, the geofencing component 308 can determine the location range as described herein with respect to estimated coverage area of FIG. 5. In some instances, the geofencing component 308 can determine areas where network resources (e.g., new base stations) are to be deployed to confirm signal status in that area. In some instances, the geofencing component 308 can send indications of the geofenced locations to one or more user equipment to collect metrics, as discussed herein.

The enablement component 310 can include functionality to enable a roaming analysis component for individual user equipment. For example, the enablement component 310 can send invitations to various user equipment to determine if users of the user equipment wish to activate the roaming analyzer, as discussed herein. In some instances, the enablement component 310 can enable the roaming analyzer component for individual user equipment based at least in part on characteristics of the user component, such as whether an antenna of the user equipment is configured to receive signals associated with particular frequency resources.

In further examples, the enablement component 310 can provide an instruction or indication to conduct drive-testing in an area based at least in part on metrics obtained by user equipment, as discussed herein.

The dependency component 312 can interact with the aggregation component 304 and include functionality to analyze the aggregated metrics to estimate roaming coverage for each location range or location area code (LAC), as discussed herein. In some instances, the dependency component 312 can determine a dependency index associated with a roaming carrier based on the area code, and the aggregated metrics can be indexed by LAC, MCC/MNC identifying the roaming carrier, the number of calls served by the roaming carrier in the area, the total number of calls served in the area, and the like. In further examples, the dependency component 312 can determine the dependency index based on a first number of calls served by the roaming carrier network and a second number of total calls associated with the region of interest (e.g., LAC). For instance, in a LAC with 200 calls, where 50 calls were served by a provider cell and 150 calls served by Roaming Carrier A's cell, the dependency index of Roaming Carrier A for the LAC would be 75%.

In some instances, dependency component 312 can perform any statistical analysis on the metrics, dependency index, and/or coverage index to evaluate roaming contracts to determine if such contracts are needed and/or to adjust a scope (region size) of the roaming contract to reduce business expenses. In some instances, the dependency component 312 can generate a recommendation report based on the statistical analysis to present evaluation results and provide recommendations. In some instances, the dependency component 312 can perform dependency analysis for a location range as described herein with respect to FIG. 5.

In some instances, the dependency component 312 can correspond to the dependency component 118 of FIG. 1.

The coverage index component 314 can include functionality to determine the coverage index for a location range or location area code (LAC), as discussed herein. In some instances, the coverage index component 314 can determine the number of calls served by the service provider for a location area code (LAC). The LAC may include multiple cells. The coverage index component 314 can determine a first number of calls from user equipment served by a roaming cell and a second number of calls from user equipment served by a provider cell. The portion of provider-served calls out of a total number of calls in a LAC can be referred to as "provider dominance" or a "coverage index." In further examples, the coverage index component 314 can determine the coverage index based on a first number of calls served by the provider network and a second number of total calls associated with the region of interest (e.g., LAC).

For example, in a first LAC with 200 calls, where 150 calls were served by a provider cell and 50 calls served by a roaming cell, the coverage index or provider dominance of the first area would be 75%. In a second LAC, with 100 calls, where 20 were served by the provider cell and 80 were served by the roaming cell, the coverage index would be 20%. Relative to the first LAC, the first coverage index would be considered "high" while the second coverage index would be considered "low." In some instances, such "high" and "low" can be considered to be relative terms and/or can be considered with respect to a threshold value. For instance, the threshold may be 50%, and a coverage index that is equal to 50% or lower may be "low," while a coverage index above 50% may be "high." Although the coverage index is expressed at a percentage here, it can be any numeric expression, including fraction.

In additional examples, the coverage index component 314 can send the coverage index to a user equipment that is connected to a roaming cell in the region of interest, as discussed herein. In examples, the coverage index component 314 can generate recommendations to increase coverage for areas with a low coverage index, which may include changing a direction of an antenna, adjusting power, and/or installing additional base stations to increase coverage, as discussed herein. The changing a direction of an antenna can be referred to as a "tilt" and may include rotating the antenna to change the direction of broadcast for the antenna or tilting the antenna to change the angle of the antenna with respect to a ground.

In some embodiments, the processor(s) 316 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 300. Any such tangible computer-readable media can be part of the network device 300.

The network device 300 can include input device(s) 322, such as a keypad, a cursor control, a touch-sensitive display, etc. Also, the network device 300 can include output device(s) 324, such as a display, speakers, etc. These devices are well known in the art and need not be discussed at length here.

As illustrated in FIG. 3, the network device 300 can include one or more wired or wireless transceiver(s) 326. In some wireless embodiments, to increase throughput, the transceiver(s) 326 can utilize multiple-input/multiple-output (MIMO) technology. The transceiver(s) 326 can be any sort of wireless transceivers capable of engaging in wireless, radio frequency (RF) communication. The transceiver(s) 326 can also include other wireless modems, such as a modem for engaging in Wi-Fi, WiMax, Bluetooth, infrared communication, or the like.

Figure 4:
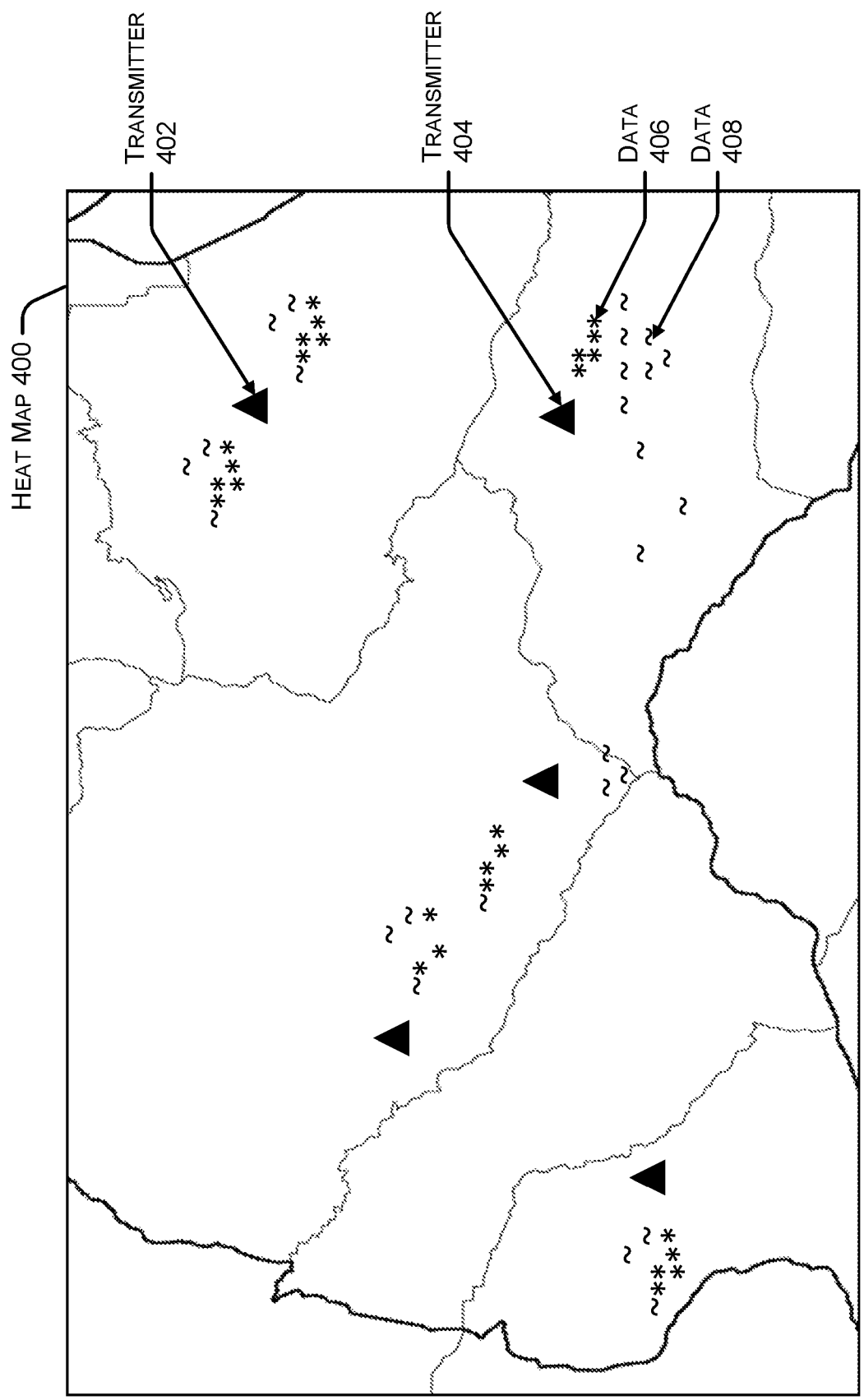
FIG. 4 illustrates an example visualization of roaming data including call information captured using a roaming analyzer, as discussed herein.

FIG. 4 illustrates an example visualization of data including data captured using a roaming analyzer, as discussed herein. In some instances, the example visualization can be represented as a heat map 400.

In some instances, the heat map 400 can represent various transmitters 402 and 404 in an environment. Further, the heat map 400 can represent various data 406 and 408, which can correspond to aggregated data and/or individual metrics collected by user equipment, as discussed herein. In some instances, the data 406 and 408 can represent various levels of metrics, such as RSSI, RSRP, RSRQ, or SINR, determined by the roaming state of user equipment. Every level of metrics can include key metrics captured at the time of a communication and can include: an MCC/MNC (mobile country code/mobile network code) (e.g., indicative of a carrier such as T-Mobile, AT&T, Commnet, etc.), geographical location of the user equipment (including latitude/longitude and location accuracy), a cell identifier of a cell serving the user equipment, and a location identifier of the cell. For example, a relatively high metric, collected by a user equipment connected to a provider cell, can be represented as the data 406, corresponding to the symbol "*". In some examples, a relatively lower metric, collected by a user equipment connected to a roaming cell, can be represented as the data 408, corresponding to the symbol "~". Of course, any indications (e.g., color, size, shape, labels, etc.) can be used to distinguish between various metrics. In some instances, the heat map 400 can be used in part to determine locations where active transmitters (e.g., the transmitter 402 or 404) are located, where user equipment is in roaming mode, and the like, and/or where to deploy additional base stations, for example.

In some instances, the heat map 400 can be generated by the aggregation components 116 and 304, as discussed herein. Of course, the example visualizations are not limited to the heat map 400. Further, the transmitters 402 and 404 are not limited to transmitters and include any transceivers and/or base stations.

Figure 5:
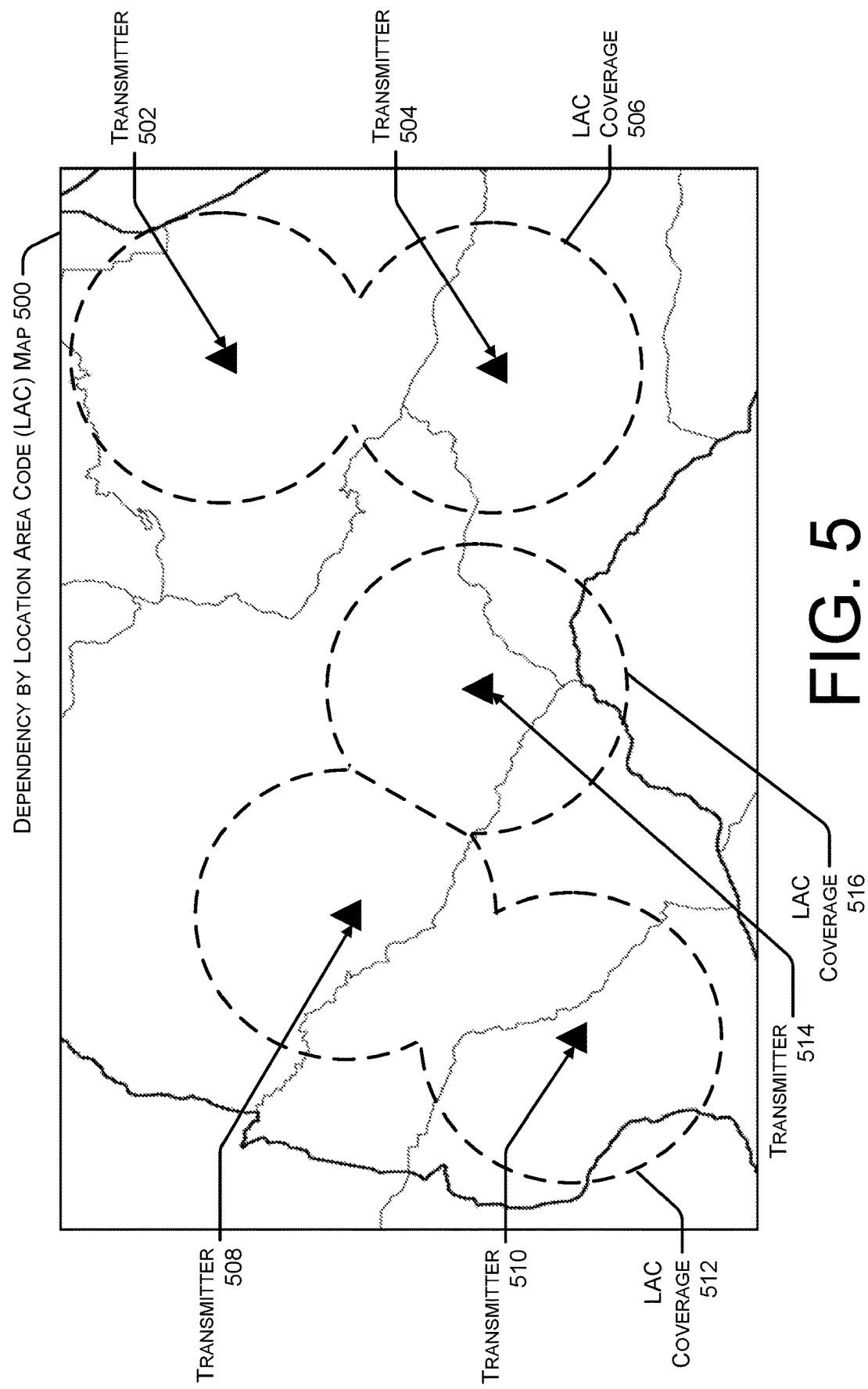
FIG. 5 illustrates an example visualization of provider dependency by the location area code (LAC) based on call information captured using a roaming analyzer, as discussed herein.

FIG. 5 illustrates an example visualization of provider dependency by the location area code (LAC) based on call information captured using a roaming analyzer, as discussed herein. In some instances, the example visualization can be represented as a dependency by LAC map 500.

In some instances, the dependency by LAC map 500 can represent various transmitters 502, 504, 508, 510, and 514 in an environment. Further, the dependency by LAC map 500 can represent various LAC coverage 506, 512, and 516, which can correspond to estimated coverage area by the LAC and/or estimated dependency on the provider associated with the transmitter, as discussed herein. In some instances, the LAC coverage 506, 512, and 516 can represent three different areas identified by three unique area codes and can include multiple cells within each unique area code. For example, the LAC coverage 506 can represent coverage estimated for an area identified by first area code and can include the cells served by transmitters 502 and 504. The LAC coverage 512 can represent coverage estimated for an area identified by second area code and can include the cells served by transmitters 508 and 510. The LAC coverage 512 can represent coverage estimated for an area identified by third area code and can include the cell served by transmitter 514.

In some examples, the coverage estimated for each unique LAC can be based on the list of active transmitters within the LAC and the geolocations of the transmitters. An estimate coverage circle is drawn around each transmitter, with the radius being an estimated coverage distance (e.g., 10 miles from the transmitter). Combine the circles with belonging to the same LAC. For instance, the LAC coverage 506 can combine the circles drawn around transmitters 502 and 504 to estimate the coverage for the first area code. To determine trade area, remove the overlaps between two different LAC areas. For instance, the LAC coverage 512 and the LAC coverage 516 overlaps at the two circles drawn around transmitter 508 and transmitter 514, thus the estimated trade area removes the overlapped area between the two circles.

In some instances, the dependency by LAC map 500 can be used in part to determine locations where active transmitters (e.g., the transmitter 502, 504, 508, 510, and 514) are located and which provider the transmitters belong to, the calls served by the transmitters, and the like, and/or the estimated dependency on the roaming coverage, for example.

In some instances, the dependency by LAC map 500 can be generated by the dependency components 118 and 312, as discussed herein. Of course, the example visualizations are not limited to the dependency by LAC map 500. Further, the transmitters 502, 504, 508, 510, and 514 are not limited to transmitters and include any transceivers and/or base stations.

Figure 6:
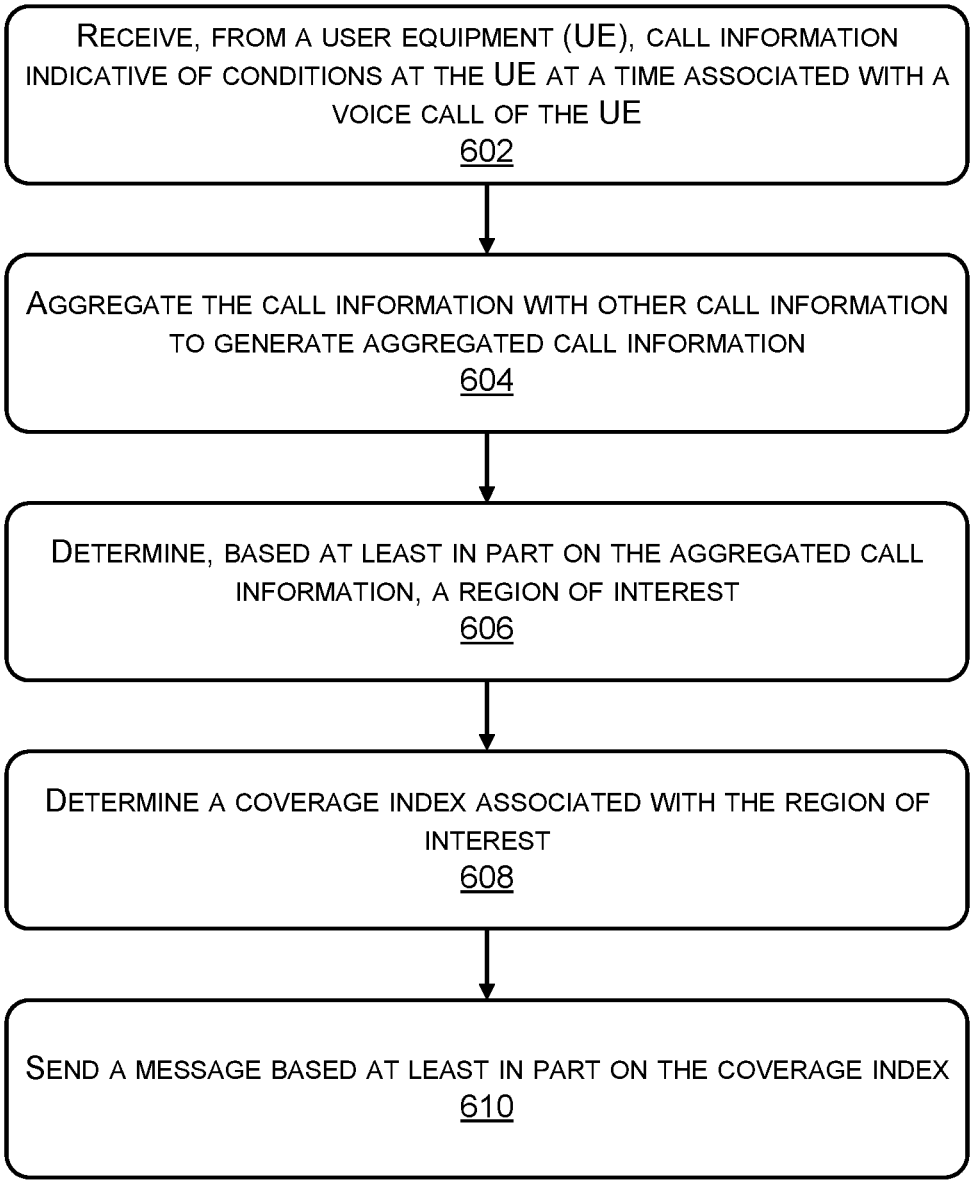
FIG. 6 illustrates an example process for receiving call information and determining the coverage index based on aggregated call information, as described herein.

FIGS. 6 and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process 600 for receiving call information and determining the coverage index based on aggregated call information, as described herein. The example process 600 can be performed by the network device(s) 112 and 300 (or another component), in connection with the user equipment 102 and 200 (or another component), and other components discussed herein. Some or all of the process 600 can be performed by one or more devices, equipment, or components illustrated in FIGS. 1-3, for example.

At operation 602, the process can include receiving, from a user equipment, call information indicative of conditions at the user equipment at a time associated with a voice call of the user equipment. In some instances, the operation 602 can be performed by the user equipment using the roaming analyzer component 104 or 304, for example. In some instances, the operation 602 can include one or more metrics associated with a signal received, detected, or otherwise monitored by the user equipment 200. For example, the roaming analyzer component 204 can determine metrics including but not limited to RSSI, RSRP, RSRQ, SINR, power density and the like for a specific bandwidth in the frequency domain. In some instances, the roaming analyzer component 204 can determine metrics associated with call information, such as the MCC/MNC (mobile country code/ mobile network code) (e.g., indicative of a carrier such as T-Mobile, AT&T, Commnet, etc.), geographical location of the user equipment (including latitude/longitude and location accuracy), a cell identifier of a cell serving the user equipment, a location identifier of the cell, and the like.

At operation 604, the process can include aggregating the call information with other call information to generate aggregated call information. As discussed herein, the user equipment can monitor conditions at the user equipment and provides metrics (e.g., information about location, network environment, call status, etc.) indicative of the conditions to a network server for subsequent analysis. The call information can include, but are not limited to, one or more of RSSI, RSRP, RSRQ, SINR, channel identifier, channel frequency, timing information (e.g., delay), and the like. In some instances, the one or more metrics can also include information associated with the user equipment, including but not limited to, one or more of a user equipment identifier, antenna capabilities, software version, hardware version, amount of power consumed, number of measurements, and the like. In some instances, the operation 604 can include performing any signal processing and/or statistical analysis on signals and/or data to determine the one or more metrics. Additionally, the operation 604 can receive a plurality of metrics and store the metrics in a database. In some instances, the metrics can be aggregated and indexed by location, time, user equipment, and the like.

At operation 606, the process can include determining, based at least in part on the aggregated call information, a region of interest. For example, the region of interest can include a location of the user equipment at the time in which the call information is determined with respect to the conditions at the user equipment. In some instances, the region of interest can be based at least in part on GPS data captured by the user equipment. In some instances, the operation 606 can be performed by the network device using the dependency component 118 or 312, for example. The operation 606 can include functionality to analyze the aggregated metrics to estimate roaming coverage for each location range or location area code (LAC), as discussed herein. In some instances, the dependency component 312 can determine the carrier dependency by the LAC and the aggregated metrics can be indexed by LAC, MCC/MNC identifying a carrier, and the like.

At operation 608, the process can include determining a coverage index associated with the region of interest. For example, the operation 608 can include functionality to determine the coverage index for a location range or location area code (LAC), as discussed herein. In some instances, the operation 608 can determine the number of calls served by the service provider for a location area code (LAC). The LAC may include multiple cells. The operation 608 can determine a first number of calls from user equipment served by a roaming cell and a second number of calls from user equipment served by a provider cell. The portion of provider-served calls out of a total number of calls in a LAC can be referred to as "provider dominance" or a "coverage index." In further examples, the operation 608 can determine the coverage index based on a first number of calls served by the provider network and a second number of total calls associated with the region of interest (e.g., LAC).

At operation 610, the process can include sending a message based at least in part on the coverage index. For example, the operation 610 can include sending the coverage index to a user equipment that is connected to a roaming cell in the region of interest, as discussed herein. In examples, the operation 610 can generate recommendations to increase coverage for areas with a low coverage index, which may include changing a direction of an antenna, adjusting power, and/or installing additional base stations to increase coverage, as discussed herein.

FIG. 7 illustrates an example process 700 for instructing components of a user equipment to capture call information and receive coverage index, as described herein. The example process 700 can be performed by the user equipment 102 and 200 (or another component), in connection with the network device(s) 112 and 300 (or another component), and other components discussed herein. Some or all of the process 700 can be performed by one or more devices, equipment, or components illustrated in FIGS. 1-3, for example.

At operation 702, the process can include capturing, by a user equipment, call information associated with a communication. In some instances, the operation 702 can be performed by the user equipment using the roaming analyzer component 104 or 204, for example. In some instances, the operation 702 can include one or more metrics associated with a signal received or detected and/or call information from communication otherwise monitored by the user equipment 200. In some instances, the roaming analyzer component 204 can determine metrics associated with call information, such as the MCC/MNC (mobile country code/ mobile network code) (e.g., indicative of a carrier such as T-Mobile, AT&T, Commnet, etc.), geographical location of the user equipment (including latitude/longitude and location accuracy), a cell identifier of a cell serving the user equipment, a location identifier of the cell, and the like.

At operation 704, the process can include sending the call information to a remote computing device, such as the network device(s) 112 and 300 of FIGS. 1 and 3. In some instances, the operation 704 can be performed by the user equipment using reporting component 214. In some instances, the reporting component 214 can send the one or more metrics to a network device as the one or more metrics are generated, captured, or determined. In some instances, the reporting component 214 can aggregate the metrics and send the aggregated metrics to the network device. In some instances, the reporting component 214 can send a reduced data set based on the roaming state of the user equipment 200 (e.g., when the user equipment 200 is connected to a roaming network). In some instances, the reporting component 214 can send the metrics at a time of low network congestion (e.g., at night). In some instances, the reporting component 214 can transmit metrics in response to a query from a network device, for example. In some instances, the reporting component 214 can encode the data sent to a network device such that a service provider tracking data usage does not count the data against a quota associated with the user equipment 200.

At operation 706, the process can include receiving, from the computing device, a coverage index. In some instances, the operation 706 can be performed by the user equipment using the roaming analyzer component 204 can receive a coverage index determined by the network device. As will be described herein with respect to network device 300, a coverage index can be determined for a location range or location area code (e.g., region of interest). When a user equipment enters a LAC, and when the user equipment is connected to a roaming cell, the coverage index can be used to adjust a frequency of searching for a provider cell. This optimizes a battery life of the user equipment by preventing searching for a provider cell in areas with a low coverage index.

At operation 708, the process can include determining that the user equipment is at a location associated with the region of interest. In some instances, the operation 708 can be performed by the user equipment using the location component 210 to determine a location of the user equipment. In some instances, the location component 210 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the location component 210 can determine a location of the user equipment 200 relative to a location of a region of interest. For example, the location component 210 can receive the region of interest from a network device.

At operation 710, the process can include determining that the user equipment is in a roaming state at the location. In some instances, the location component 210 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the operation 710 can determine based on the MNC/MCC that the carrier is different and thus the user equipment is connected to a roaming cell.

At operation 712, the process can include scanning one or more wireless resources for a signal associated with the first network. In some instances, the operation 712 can be performed by the user equipment using roaming analyzer component 204 to scan one or more wireless resources for a signal associated with the first network at any regular or irregular interval or can initiate a scan based on an internal or external trigger or command. For example, the roaming analyzer component 204 can receive an instruction from the remote network device to initiate a scan. Additionally, the roaming analyzer component 204 can initiate a rescan at a default time interval (e.g., every 1 hour). As discussed herein, the roaming analyzer component 204 can receive an instruction from the remote network device to adjust the scan frequency from the default time interval to a shorter time interval (e.g., from every 1 hour to every half hour) based on a higher coverage index. The roaming analyzer component 204 can determine a high or low coverage index based on a predetermined threshold index value. In some instances, the roaming analyzer component can determine operating conditions or characteristics of the user equipment 200 (e.g., a power resource, location, etc.), and a command to initiate scanning can be based at least in part on those operating conditions or characteristics. In some instances, the roaming analyzer component 204 can include prevent rescans based on a low coverage index.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      receiving, from a user equipment, call information indicative of conditions at the user equipment at a time associated with a voice call of the user equipment;
      aggregating the call information with other call information to generate aggregated call information;
      determining, based at least in part on the aggregated call information, a region of interest;
      determining a coverage index associated with the region of interest, wherein the coverage index is based at least in part on a first number of calls served by a first network and a second number of total calls associated with the region of interest; and
      sending a message based at least in part on the coverage index.

2. The system of claim 1, wherein the user equipment is a first user equipment, and wherein sending the message based at least in part on the coverage index comprises:
   sending the coverage index to a second user equipment, wherein the coverage index configures the second user equipment to determine a frequency of searching for the first network at a time period in which the second user equipment is in a roaming state at a location associated with the region of interest.

3. The system of claim 1, wherein sending the message based at least in part on the coverage index comprises:
   sending the message to a base station to change at least one of a tilt associated with an antenna of the base station or a transmission power associated with the antenna of the base station.

4. The system of claim 1, wherein the call information comprises:
   a mobile country code of a communication;
   a mobile network code of the communication;
   a cell identifier associated with the communication; and
   geolocation information associated with the user equipment at the time associated with the voice call.

5. The system of claim 1, wherein determining the region of interest comprises:
   determining, based at least in part on call information, a location of a base station in an environment;
   determining a radio access technology associated with the base station; and
   determining the region of interest based at least in part on a transmission range associated with the radio access technology.

6. The system of claim 1, wherein the operations further comprise:
   determining, based at least in part on call information, a roaming network associated with the region of interest;
   determining a dependency index for the roaming network, wherein the dependency index is based at least in part on a third number of calls served by the roaming network and the second number of total calls; and
   generating a recommendation report based at least in part on the dependency index.

7. The system of claim 6, wherein the recommendation report comprises a cost associated with the roaming network and an indication to deploy a base station to a location based at least in part on the dependency index.

8. A device comprising:
   one or more processors;
   a memory; and
   one or more components stored in the memory and executable by the one or more processors to perform operations comprising:
      capturing call information associated with a communication, wherein the call information comprises:
         service provider information;
         a cell identifier; and
         geolocation information of the device at a time associated with the communication;
      sending the call information to a remote computing device;
      receiving, from the remote computing device and based at least in part on the call information, a coverage index based at least in part on a first number of calls served by a first network in a region of interest and a second number of total calls associated with the region of interest;
      determining that the device is at a location associated with the region of interest;
      determining that the device is in a roaming state at the location; and
      scanning one or more wireless resources for a signal associated with the first network based at least in part on the coverage index.

9. The device of claim 8, wherein the device is a mobile telephone, and wherein the scanning the one or more wireless resources is performed by an application operating on the mobile telephone.

10. The device of claim 8, wherein the operations further comprise:
   determining a power resource associated with the device; and
   wherein the scanning the one or more wireless resources is further based at least in part on the power resource.

11. The device of claim 8, wherein the operations further comprise:
   determining that the signal associated with the first network is unavailable; and
   determining to change a scan frequency based at least in part on the coverage index.

12. The device of claim 11, wherein the operations further comprise:
   determining a power resource associated with the device; and
   determining to decrease the scan frequency based at least in part on the power resource.

13. The device of claim 8, wherein determining that the device is in the roaming state is based at least in part on the service provider information.

14. A method comprising:
   capturing, by a user equipment, call information associated with a communication, wherein the call information comprises:
      service provider information;
      a cell identifier; and
      geolocation information of the user equipment at a time associated with the communication;
   sending, by the user equipment, the call information to a remote computing device;
   receiving, from the remote computing device and based at least in part on the call information, a coverage index based at least in part on a first number of calls served by a first network in a region of interest and a second number of total calls associated with the region of interest;
   determining that the user equipment is in a roaming state; and
   determining to change a frequency for scanning one or more wireless resources for a signal associated with the first network based at least in part on the coverage index.

15. The method of claim 14, wherein the method further comprises:
   determining that the coverage index is below a threshold; and
   determining to decrease the frequency for the scanning.

16. The method of claim 14, wherein the method further comprises:
   determining that the coverage index is within a threshold; and
   determining to increase the frequency for the scanning.

17. The method of claim 14, wherein the method further comprises:
   determining a power resource associated with the user equipment; and
   determining to stop the scanning of the one or more wireless resources based at least in part on the power resource.

18. The method of claim 14, wherein the method further comprises:
   determining a power resource associated with the user equipment;
   determining a location associated with the user equipment; and
   initiating the scanning of the one or more wireless resources based at least in part on the power resource and the location.

19. The method of claim 14, wherein the method further comprises:
   determining that the user equipment is at a location associated with the region of interest; and
   scanning the one or more wireless resources for the signal associated with the first network based at least in part on the coverage index.

20. The method of claim 19, wherein the method further comprises:
   determining a power resource associated with the user equipment; and
   rescanning the one or more wireless resources for the signal after a wait time based at least in part on the frequency.

* * * * *